United States Patent
Kastner

(10) Patent No.: US 10,933,357 B2
(45) Date of Patent: Mar. 2, 2021

(54) FILTER SYSTEM FOR VISCOUS OR HIGHLY VISCOUS LIQUIDS, IN PARTICULAR PLASTIC MELTS AND METHOD FOR FILTERING VISCOUS OR HIGHLY VISCOUS LIQUIDS

(71) Applicant: Next Generation Analytics GmbH, Grieskirchen (AT)

(72) Inventor: Friedrich Kastner, Grieskirchen (AT)

(73) Assignee: Next Generation Analytics GmbH, Grieskirchen (AT)

(*) Notice: Subject to any disclaimer, the term of this patent is extended or adjusted under 35 U.S.C. 154(b) by 370 days.

(21) Appl. No.: 15/728,865

(22) Filed: Oct. 10, 2017

(65) Prior Publication Data

US 2018/0104625 A1    Apr. 19, 2018

(30) Foreign Application Priority Data

Oct. 17, 2016 (EP) .................... 16002224

(51) Int. Cl.
| | |
|---|---|
| *B01D 33/01* | (2006.01) |
| *B29C 48/25* | (2019.01) |
| *B29C 48/50* | (2019.01) |
| *B29C 48/27* | (2019.01) |
| *B29C 48/691* | (2019.01) |
| *B29C 48/692* | (2019.01) |
| *B01D 33/46* | (2006.01) |
| *B01D 33/50* | (2006.01) |
| *B01D 33/76* | (2006.01) |

(52) U.S. Cl.
CPC ....... *B01D 33/0183* (2013.01); *B01D 33/466* (2013.01); *B01D 33/503* (2013.01); *B01D 33/76* (2013.01); *B29C 48/256* (2019.02); *B29C 48/2528* (2019.02); *B29C 48/2545* (2019.02); *B29C 48/273* (2019.02); *B29C 48/2735* (2019.02); *B29C 48/503* (2019.02); *B29C 48/692* (2019.02); *B29C 48/6912* (2019.02)

(58) Field of Classification Search
None
See application file for complete search history.

(56) References Cited

U.S. PATENT DOCUMENTS

| | | | | |
|---|---|---|---|---|
| 2,786,504 A | * | 3/1957 | Samler | B29C 48/09 137/547 |
| 2,822,197 A | * | 2/1958 | Champ | F16C 33/74 277/391 |
| 3,007,199 A | * | 11/1961 | Curtis | B29C 48/6912 425/185 |
| 3,059,276 A | * | 10/1962 | Yokana | B29C 48/691 425/185 |
| 3,146,494 A | * | 9/1964 | Sponaugle | B29C 48/69 425/199 |

(Continued)

FOREIGN PATENT DOCUMENTS

| | | |
|---|---|---|
| AT | 404 562 | 12/1998 |
| CN | 104526908 | 4/2015 |

(Continued)

*Primary Examiner* — Robert J Popovics
(74) *Attorney, Agent, or Firm* — Wenderoth, Lind & Ponack, L.L.P.

(57) ABSTRACT

A device and a method for filtering viscous or highly viscous liquids, in particular plastics melts, includes use of an oscillating filter plate.

4 Claims, 5 Drawing Sheets

(56) References Cited

U.S. PATENT DOCUMENTS

| | | | | |
|---|---|---|---|---|
| 3,243,849 A * | 4/1966 | Joukainen | B29C 48/691 | 210/340 |
| 3,471,017 A * | 10/1969 | Kalman | B01D 37/00 | 210/774 |
| 3,503,096 A * | 3/1970 | Marianelli | H01L 29/00 | 210/341 |
| 3,645,399 A * | 2/1972 | Kalman | B01D 35/06 | 210/745 |
| 3,653,419 A * | 4/1972 | Schutter | B29C 48/03 | 210/447 |
| 3,669,166 A * | 6/1972 | Colin | B29C 48/6914 | 425/183 |
| 3,675,934 A * | 7/1972 | Heston | B29C 48/254 | 210/447 |
| 3,743,101 A * | 7/1973 | Schmidt | B29C 48/6912 | 210/447 |
| 3,797,665 A * | 3/1974 | Paquette | D01D 1/10 | 210/236 |
| 3,804,758 A * | 4/1974 | Cooper | B29C 48/6912 | 210/741 |
| 3,856,674 A * | 12/1974 | Kalman | B01D 29/608 | 210/774 |
| 3,856,680 A * | 12/1974 | Elmore | B29C 48/6912 | 210/184 |
| 3,900,399 A * | 8/1975 | Kreyenborg | B29C 48/6912 | 210/236 |
| 3,940,335 A * | 2/1976 | Kalman | B01D 29/096 | 210/780 |
| 3,947,202 A * | 3/1976 | Goller | B29C 48/6912 | 425/185 |
| 3,962,092 A * | 6/1976 | Newman, Jr. | B01D 29/05 | 210/236 |
| 3,971,721 A * | 7/1976 | Fogarty, Jr. | B01D 33/04 | 210/401 |
| 3,983,038 A * | 9/1976 | Heston | B01D 29/05 | 210/447 |
| 4,021,346 A * | 5/1977 | Berthiaume | B01D 29/09 | 210/179 |
| 4,025,434 A * | 5/1977 | Mladota | B01D 29/01 | 210/236 |
| 4,059,525 A * | 11/1977 | Krasnow | B01D 29/09 | 210/236 |
| 4,070,293 A * | 1/1978 | Fogarty, Jr. | B01D 33/056 | 210/401 |
| 4,080,297 A * | 3/1978 | Yoshida | B01D 29/09 | 210/387 |
| 4,159,953 A * | 7/1979 | Paquette | B01D 29/09 | 210/396 |
| 4,167,384 A * | 9/1979 | Shirato | B29C 48/6912 | 425/183 |
| 4,237,014 A * | 12/1980 | Trott | B29C 48/07 | 210/330 |
| 4,265,756 A * | 5/1981 | Schiesser | B01D 29/01 | 210/236 |
| 4,268,391 A * | 5/1981 | Paquette | B29C 48/6912 | 210/236 |
| 4,318,677 A * | 3/1982 | Ullrich | B29C 48/6912 | 425/183 |
| 4,332,541 A * | 6/1982 | Anders | B01D 33/073 | 425/197 |
| 4,358,262 A * | 11/1982 | Herbert | B29C 48/693 | 425/185 |
| 4,359,387 A * | 11/1982 | Trott | B01D 29/01 | 210/352 |
| 4,395,212 A * | 7/1983 | Lambertus | F16J 15/403 | 425/185 |
| 4,468,322 A * | 8/1984 | Fogarty, Jr. | B29C 48/6912 | 210/236 |
| 4,507,072 A * | 3/1985 | Gaul, Jr. | B29C 48/74 | 425/185 |
| 4,511,320 A * | 4/1985 | Lambertus | B29C 48/79 | 425/199 |
| 4,511,472 A * | 4/1985 | Trott | B29C 48/691 | 210/340 |
| 4,588,502 A * | 5/1986 | Zibell | B29C 48/6914 | 210/171 |
| 4,597,870 A * | 7/1986 | Lambertus | B01D 29/925 | 210/341 |
| 4,654,151 A * | 3/1987 | Kalman | B29C 48/6912 | 210/774 |
| 4,710,288 A * | 12/1987 | Patrovsky | B29B 13/10 | 210/111 |
| 4,814,186 A * | 3/1989 | Trott | B01D 29/05 | 425/199 |
| 4,842,750 A * | 6/1989 | Britchi | B29C 48/692 | 210/791 |
| 4,849,113 A * | 7/1989 | Hills | B01D 29/09 | 210/741 |
| 4,850,840 A * | 7/1989 | Gneuss | B29C 48/6914 | 425/182 |
| 4,888,110 A * | 12/1989 | Fogarty, Jr. | B01D 29/76 | 210/106 |
| 5,004,414 A * | 4/1991 | Stude | B29C 48/6912 | 425/185 |
| 5,032,267 A * | 7/1991 | Petschner | B01D 29/01 | 210/236 |
| 5,090,887 A * | 2/1992 | Gneuss | B01D 29/01 | 425/185 |
| 5,122,286 A * | 6/1992 | Kreyenborg | B01D 29/668 | 210/791 |
| 5,141,631 A * | 8/1992 | Whitman | B01D 29/05 | 210/108 |
| 5,200,077 A * | 4/1993 | McNeice | B01D 29/15 | 210/323.2 |
| 5,308,484 A * | 5/1994 | Bacher | B01D 29/70 | 210/232 |
| 5,320,753 A * | 6/1994 | Keillor, III | B01D 33/04 | 210/398 |
| 5,362,223 A * | 11/1994 | Gneuss | B29C 48/6914 | 425/185 |
| 5,407,586 A * | 4/1995 | Gneuss | B29C 48/6914 | 210/780 |
| 5,417,856 A * | 5/1995 | Bacher | B29C 48/2554 | 210/333.1 |
| 5,417,866 A * | 5/1995 | Trott | B29C 48/6912 | 210/791 |
| 5,439,589 A * | 8/1995 | Whitman | B01D 29/01 | 210/436 |
| 5,453,194 A * | 9/1995 | Klein | B01D 39/20 | 210/411 |
| 5,456,828 A * | 10/1995 | Tersi | B01D 29/114 | 210/184 |
| 5,462,653 A * | 10/1995 | Hills | B01D 29/114 | 210/85 |
| 5,507,498 A * | 4/1996 | Trott | B01D 29/05 | 277/300 |
| 5,516,426 A * | 5/1996 | Hull | B01D 33/15 | 210/256 |
| 5,578,206 A * | 11/1996 | Ogoshi | B01D 29/01 | 210/236 |
| 5,603,828 A * | 2/1997 | Ishida | B29C 48/6912 | 210/239 |
| 5,632,902 A * | 5/1997 | Kalman | B01D 29/668 | 210/741 |
| 5,738,884 A * | 4/1998 | Sato | B29C 48/362 | 425/197 |
| 5,752,539 A * | 5/1998 | Kalman | B29C 48/92 | 137/13 |
| 5,770,067 A * | 6/1998 | Hangmann | B29C 48/6912 | 210/236 |
| 5,779,898 A * | 7/1998 | Schwanekamp | B29C 48/273 | 210/324 |
| 5,783,223 A * | 7/1998 | Anderson | B29C 45/24 | 425/185 |
| 5,840,197 A * | 11/1998 | Ishida | B29C 48/6912 | 210/780 |
| 5,922,194 A * | 7/1999 | Bruckmann | B29C 45/24 | 210/90 |

(56) References Cited

U.S. PATENT DOCUMENTS

| | | | | |
|---|---|---|---|---|
| 5,958,255 A * | 9/1999 | Hobrecht | ............ | B29C 48/2725 |
| | | | | 210/790 |
| 6,010,625 A * | 1/2000 | Whitman | ............ | B01D 29/01 |
| | | | | 210/236 |
| 6,117,338 A * | 9/2000 | Hoagland | ............ | B01D 35/12 |
| | | | | 210/767 |
| 6,149,807 A * | 11/2000 | Previero | ............ | B01D 29/096 |
| | | | | 210/236 |
| 6,153,093 A * | 11/2000 | Bentivoglio | ........ | B29C 48/2554 |
| | | | | 210/108 |
| 6,168,411 B1 * | 1/2001 | Wildman | ............ | B01D 29/33 |
| | | | | 425/197 |
| 6,196,820 B1 * | 3/2001 | Straka | ............ | B29C 45/1753 |
| | | | | 210/184 |
| 6,216,880 B1 * | 4/2001 | Previero | ............ | B01D 29/096 |
| | | | | 210/359 |
| 6,227,380 B1 | 5/2001 | Bacher et al. | | |
| 6,238,558 B1 * | 5/2001 | Kelley | ............ | B01D 29/01 |
| | | | | 210/236 |
| 6,260,852 B1 * | 7/2001 | Reineke | ............ | B29C 48/09 |
| | | | | 277/609 |
| 6,261,079 B1 * | 7/2001 | Ishida | ............ | B01D 29/52 |
| | | | | 425/197 |
| 6,270,703 B1 * | 8/2001 | Wildman | ............ | B01D 29/33 |
| | | | | 264/39 |
| 6,290,846 B1 * | 9/2001 | Hangmann | ......... | B29C 48/6912 |
| | | | | 210/236 |
| 6,325,217 B1 * | 12/2001 | Hehenberger | ......... | B01D 35/12 |
| | | | | 210/411 |
| 6,342,156 B1 * | 1/2002 | Sanders | ............ | B29C 48/6912 |
| | | | | 210/224 |
| 6,375,013 B1 * | 4/2002 | Gail | ............ | B01D 29/09 |
| | | | | 210/391 |
| 6,500,336 B1 * | 12/2002 | Gneuss | ............ | B29C 48/6912 |
| | | | | 210/236 |
| 6,533,934 B1 * | 3/2003 | Trendelkamp | ...... | B29C 48/6912 |
| | | | | 210/236 |
| 6,537,454 B1 * | 3/2003 | Bacher | ............ | B29C 48/27 |
| | | | | 210/236 |
| 6,582,598 B2 * | 6/2003 | Patrovsky | ............ | B01D 29/012 |
| | | | | 210/330 |
| 6,641,728 B2 * | 11/2003 | Emhardt | ............ | B29C 45/24 |
| | | | | 210/236 |
| 6,843,915 B2 * | 1/2005 | Gneuss | ............ | B29C 48/6914 |
| | | | | 210/330 |
| 7,147,774 B2 * | 12/2006 | Jones, III | ............ | B01D 29/03 |
| | | | | 210/236 |
| 7,530,463 B2 * | 5/2009 | Bacher | ............ | B29C 48/69 |
| | | | | 210/427 |
| 7,820,039 B2 | 10/2010 | Schulz | | |
| 7,824,544 B2 * | 11/2010 | Edinger | ............ | B29C 48/92 |
| | | | | 210/90 |
| 8,017,010 B2 * | 9/2011 | Woestmann | ........ | B29C 48/6912 |
| | | | | 210/333.01 |
| 8,202,423 B2 * | 6/2012 | Gneuss | ............ | B29C 48/6914 |
| | | | | 210/330 |
| 8,628,323 B2 * | 1/2014 | Craig | ............ | B29C 45/542 |
| | | | | 425/557 |
| 8,876,517 B2 * | 11/2014 | Tuttle | ............ | B29C 48/2545 |
| | | | | 425/197 |
| 9,090,002 B2 * | 7/2015 | Trott | ............ | F16J 15/164 |
| 9,364,778 B2 * | 6/2016 | Hartmann | ............ | B01D 33/01 |
| 9,468,873 B2 * | 10/2016 | Middler | ............ | B29C 48/273 |
| 9,486,723 B2 * | 11/2016 | Gneuss | ............ | B01D 33/804 |
| 9,504,938 B2 * | 11/2016 | Woestmann | ........ | B01D 29/52 |
| 9,539,753 B2 * | 1/2017 | Middler | ............ | B29C 48/6916 |
| 9,855,699 B2 * | 1/2018 | Wostmann | ............ | B29C 48/69 |
| 9,993,752 B2 * | 6/2018 | Middler | ............ | B29C 48/273 |
| 10,093,034 B2 * | 10/2018 | Ahlgrimm | ............ | B29B 7/42 |
| 10,265,649 B2 * | 4/2019 | Ettlinger | ............ | B29C 48/69 |
| 10,307,953 B2 * | 6/2019 | Panebianco | ......... | B29C 48/692 |
| 10,350,519 B2 * | 7/2019 | Pohl | ............ | B01D 29/96 |
| 10,807,295 B2 * | 10/2020 | Kastner | ............ | B29C 48/2725 |
| 2006/0157402 A1 * | 7/2006 | Bacher | ............ | B29C 48/273 |
| | | | | 210/333.01 |
| 2013/0087975 A1 * | 4/2013 | Trott | ............ | F16J 15/164 |
| | | | | 277/308 |
| 2014/0305853 A1 * | 10/2014 | Panebianco | ......... | B29C 48/2725 |
| | | | | 210/97 |
| 2016/0136546 A1 * | 5/2016 | Ettlinger | ............ | B01D 29/66 |
| | | | | 210/791 |
| 2018/0065288 A1 * | 3/2018 | Kastner | ............ | B29C 48/2735 |
| 2018/0104625 A1 * | 4/2018 | Kastner | ............ | B01D 33/0183 |
| 2019/0091916 A1 * | 3/2019 | Prinzo | ............ | B29C 48/692 |

FOREIGN PATENT DOCUMENTS

| | | | | |
|---|---|---|---|---|
| DE | 41 16 199 | | 11/1992 | |
| DE | 44 26 629 | | 2/1996 | |
| DE | 10 2016 202 489 | | 8/2016 | |
| DE | 102016202489 A1 * | | 8/2016 | ............ G01N 11/04 |
| EP | 0 925 904 | | 6/1999 | |
| EP | 3308940 A1 * | | 4/2018 | .......... B01D 33/466 |
| SU | 1110651 | | 8/1984 | |
| WO | WO-2005072932 A9 * | | 11/2005 | ............ B01D 29/70 |
| WO | 2008/031127 | | 3/2008 | |

\* cited by examiner

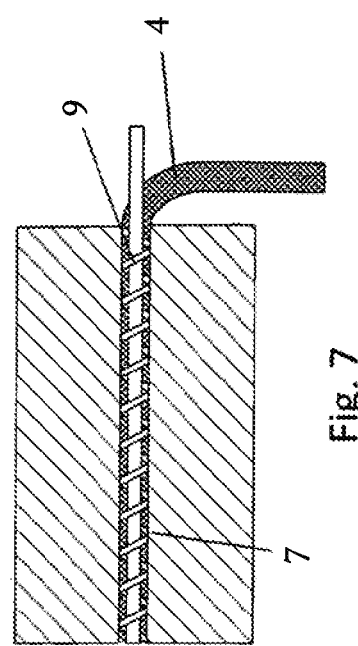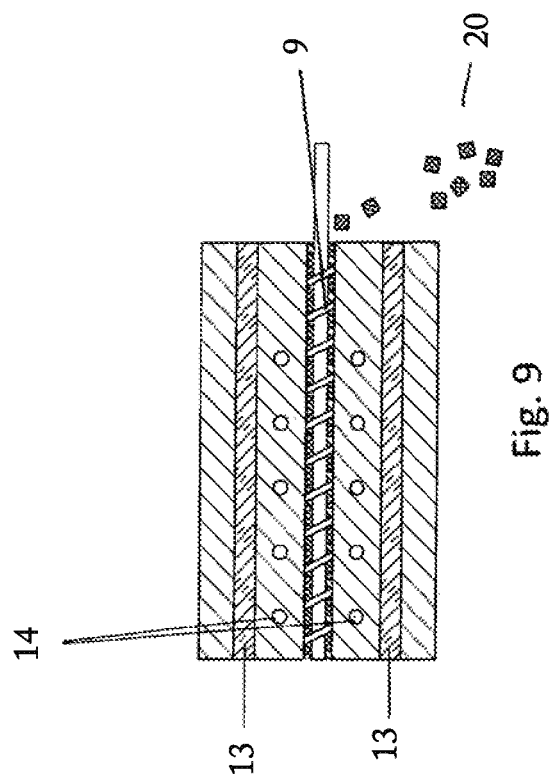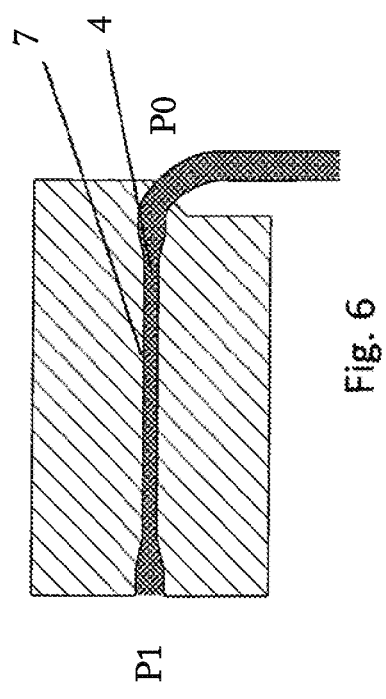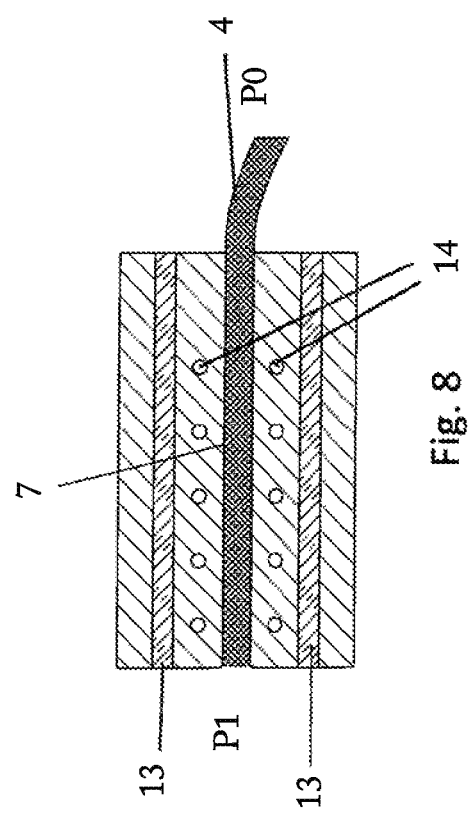

FILTER SYSTEM FOR VISCOUS OR HIGHLY VISCOUS LIQUIDS, IN PARTICULAR PLASTIC MELTS AND METHOD FOR FILTERING VISCOUS OR HIGHLY VISCOUS LIQUIDS

BACKGROUND OF THE INVENTION

The invention relates to a method and an apparatus for filtering viscous or highly viscous liquids, in particular plastics melts, using a filter plate.

To remove contaminants from viscous or highly viscous liquids, in particular plastics melts, the prior art generally uses filtration apparatuses which use various filter embodiments.

Contaminants which frequently occur in viscous or highly viscous liquids, such as for example plastics melts, are for example organic or inorganic contaminants, such as metals, mineral substances and the like, or contaminants resulting from other polymers, foreign particles, excessively coarse added substances and additives and agglomerates thereof. Further problematic contaminants are for example degradation products of the viscous or highly viscous liquid, which arise in use, production or other proper or improper uses, for example exposure to excessive temperatures, or during production, for example in the case of plastics, by excessive or inadequate crosslinking, such as for example gels.

The filters used in this respect are in particular sieve plates or indeed filter belts or "belt filters".

In any event, the openings in the corresponding filter must be smaller than the contaminants to be retained and separated from the viscous or highly viscous liquid.

As a result of deposition of the contaminants on the filter belt or sieve plate, the degree of contamination of the respective filter unit used increases more or less quickly as a function of the degree of contamination of the viscous or highly viscous liquid and the throughput thereof through the filtration apparatus. In the worst case, this may result in as good as no liquid any longer being able to pass through the filter.

As a function of the filter embodiment used, a sieve plate must therefore for example be replaced or back-flushed. Cleaning then proceeds as a function of the degree of contamination or pressure build-up or at fixed times.

This generally means that material flow is not continuous, since the melt may be passed through other chambers during replacement or the back-flushing process, possibly resulting in pressure pulses and the like. Filtration conditions undergo change as a result of the pressure build-up which occurs until the filter is exchanged. Precisely in the case of highly contaminated materials with extensive, sheet-like contaminants, the filter may very rapidly become blocked, so resulting in very frequent exchange cycles interrupting material flow.

For this reason, a filtration system with continuous cleaning of the filter is highly advantageous.

In continuous systems, the filter is cleaned, for example, by rotating a plate provided with fine holes or a cylinder, or cleaning is performed constantly by a rotating scraper or a screw mounted in the material stream on the sieve surface. In the process, the contaminants are conveyed outwards through suitable transport ducts and pressure-reducing mechanisms.

A disadvantage here is the mechanical contact between the cleaning apparatus and the sieve plate or the filter belt, which, in particular in the case of high levels of mineral or metallic contamination, leads to high levels of wear to the sieve plate or the filter belt. Moreover, in most systems relatively large dead volumes arise, with long material holding times, which may lead to melt degradation.

When cleaning the filter plate, for example, using scrapers, screws and the like, melt does not flow through the cleaning zone and a "food mill effect" arises, i.e. comminution of the contaminants and thus passage of the contaminants through the filter plate.

A filter apparatus is known, for example, from AT 404562 B for liquids containing contaminants, in which the filter is cleaned by a scraper element.

A filter apparatus is known from DE 10 2016 202 489 which comprises an inlet chamber, an outlet chamber and a filter system separating inlet chamber and outlet chamber, wherein the inflow direction of the liquid to be filtered is at an angle of between 10° and 90°, in particular between 30° and 70°, relative to the surface normal of the filter. This tangential inflow to the filter enables very small chamber volumes.

SUMMARY OF THE INVENTION

The object of the present invention is to provide a filter apparatus for filtering viscous or highly viscous liquids, in particular plastics melts, which allows continuous operation and additionally the avoidance of the disadvantages of the prior art, in particular wear to the filter plate.

The present invention accordingly provides a filter system comprising a filter plate situated in a filter chamber, which is supported by a filter support plate, characterized in that either the filter plate is guided on the filter support plate by sliding elements in grooves or the filter support plate with the filter plate situated thereon is guided in the filter chamber by sliding elements and the filter plate or the filter plate together with the filter support plate is guided in an oscillating motion to clean the filter plate.

The present invention also provides a method for filtering viscous or highly viscous liquids, in particular plastics melts, including the following method steps supplying the viscous or highly viscous liquid to a filter chamber, in which a filter plate is situated which is guided in the filter chamber at the bottom and/or sides by sliding elements and which is guided in an oscillating motion supplying the viscous or highly viscous liquid to the filter chamber through an inlet opening carrying away the liquid passing through the filter plate moving the filter plate to a cleaning chamber carrying away the contaminants present on the filter plate by way of the cleaning chamber using conveying devices or a back-flushing process.

In this case, during the filter cleaning process no cleaning apparatus passes over the surface or relative to the surface of the filter plate, but rather the filter plate is moved by the motion on one side or symmetrically on each side to a cleaning chamber. A cleaning apparatus, for example a scraper, does not pass over the surface of the filter plate or relative thereto, but rather the filter plate is moved by the motion into one side or symmetrically on each side of the cleaning chamber. In this way, the cleaning process is uncoupled from the filtration process.

One substantial advantage is that during cleaning of the filter plate melt continues to flow through the latter in the filter zone and the occurrence of the "food mill effect", i.e. comminution of the contaminants and thus passage of the contaminants through the filter plate is thus virtually eliminated. In particular, gels present in the melt may be removed extremely effectively and are not forced through the filter plate during cleaning.

The filter zone is that region in which the liquid to be filtered passes through the filter plate and the filter support plate.

No filtration takes place in the cleaning zone.

Since there is also no scraper resting constantly on the plate, wear from hard contaminants of the melt, such as mineral or metallic contaminants, may also be greatly reduced.

According to the invention, the filter plate may be embodied as a solid sieve plate or indeed consist of a stack of one or more filter mats or sheets.

The sieve plate may in this case take the form of a solid plate with holes, which are produced for example by drilling, electric discharge machining, water jet, lasers, electron beam, particle beams (for example protons), by etching or the like.

In this case, depending on the embodiment, the filter plate is preferably at least twice as wide as the active filter area in the filter zone.

The filter plate or the filter support plate is guided at the bottom and sides for example via sliding elements in grooves, wherein the sliding elements may consist of low-wear materials or bearing materials, such as for example copper, aluminium bronzes, sintered elements or the like. The melt itself may here also form a thin lubricant film.

The filter plate may be supported in the filter chamber by a filter support plate, which likewise comprises openings for passage of the melt.

The filter support plate is in any event embodied in such a way that it ensures an optimum compromise between permeability, i.e. low flow resistance, and optimum strength. The openings in the filter support plate may be round, polygonal, in the form of elongate holes and the like and arranged perpendicular or at an angle to the surface in order for example to allow better flow distribution. The cross-section and directions may also vary in the longitudinal profile of the openings.

The filter support plate may moreover take the form of a plurality of layers, materials and combinations.

Thus, for example, the surface may be embodied with a particularly friction-reducing soft or hard layer or texture in order for example to facilitate sliding of the filter element.

A particularly firm, tension-resistant material may be arranged under the surface of the filter support plate. The filter support plate here consists for example of hardened steel, on the surface of which is applied a material with good sliding properties, such as for instance bronze.

In one embodiment, the filter plate may be moved to and fro, i.e. oscillated, in the filter chamber over the stationary filter support plate during the filtration process. The stationary filter support plate then acts as a separator in the melt stream.

In this case, the filter plate preferably takes the form of a solid plate, since it must be able directly to absorb the forces which arise as a result of the plate being pushed to and fro.

In a further embodiment of the invention, the entire filter plate with the filter support plate arranged therebelow may oscillate, said filter support plate at the same time absorbing the force arising from the pressure difference in the melt stream.

In this case, the filter plate may take the form of a thin plate, sheet or mat, since it does not have to absorb any thrust forces. The force which is needed to move the filter plate and the filter support plate necessary is in this case greater than in a case where only the filter plate is moved.

A combination of these embodiments is, however, also possible, wherein for example a compact but thin filter plate is oscillated over a filter support plate. Suitable measures must then be taken to absorb the higher friction forces which arise as a result of the high melt pressure. This is achieved in particular by the sliding elements being of low-wear materials or bearing materials.

Motion or oscillation of the filter plate or of the filter plate and the filter support plate may be brought about by an electrical, hydraulic, pneumatic or other mechanical drive.

A cleaning chamber is arranged on one or both sides of the filter chamber.

This cleaning chamber is arranged somewhat higher in the filter inflow direction than the filter plate itself, in order additionally to take up contaminants at the surface.

The cleaning chamber is embodied by blocking elements which, alone or in combination additional cleaning elements, seal the cleaning chamber relative to the filter chamber.

The blocking and/or cleaning elements may be moved mechanically, under the control of levers or links, by a reciprocating motion, by springs, by melt pressure, or independently electrically, mechano-pneumatically or hydraulically. The contact pressure of the blocking and/or cleaning elements may be varied as desired, depending on application.

Scraper units may preferably be considered as cleaning elements. The scrapers themselves are mounted replaceably on a base unit. The scrapers may in this case consist of metals or alloys. Sandwich structures may however also be provided, which are in each case also provided with different surface coatings such as PVD or CVD, DLC or ceramic layers, or of plastics and combinations thereof. What is essential here is the combination of the materials of scraper and sieve, in order on the one hand to enable optimum cleaning and on the other hand to keep wear levels low.

The scrapers are in this case embodied as wedges, blades, cutters, rollers, slats, a driven screw or as a combination of such embodiments. In one particular embodiment, a cleaning apparatus may also be incorporated; in this way, one or more scrapers are for example guided through a slotted plate during the backwards movement and the contaminants are scraped off as they are drawn through.

Depending on contaminant, materials, filter material etc., with this system the contact pressure may be varied virtually at will so as to enable an optimum cleaning action with minimum filter wear.

The filter plate is moved by at least one slider, which seals the cleaning chamber from the outside.

In one particular embodiment, the filter plate may ultimately be embodied such that sealing is achieved by raising the filter plate to the height of the cleaning chamber itself.

Furthermore, a plurality of sealing and/or cleaning elements may also be arranged in series.

The plate is then moved into the cleaning chamber, the piston being moved to the side to open up the volume of the cleaning chamber. In this phase, the actual cleaning elements are not or only slightly in contact with the plate surface. Only once part, for example half, of the plate has been introduced into a cleaning chamber is the latter substantially sealed from the filter chamber by the blocking and/or cleaning elements.

Then an outflow duct, which may comprise corresponding elements such as active or passive screws, helices or labyrinth-type structures, is opened by means of a valve or by the geometry of the filter plate. Moreover, the outflow duct may be separated thermally from the filter and in this way the viscosity of the outflowing material may be purposefully influenced by dedicated heating or cooling systems.

The valves may be embodied as pistons, ball valves, slide valves, or linear or rotating, and may be mechanically, pneumatically or hydraulically actuatable.

In one specific embodiment, the blocking and cleaning sliders may take the form of valves.

A profile channel may here be mounted along the slider, for example, via which the contaminants are passed to a duct incorporated into the slider. In the cleaning cycle, this slide valve is in contact with the filter. In precisely this position the duct incorporated into the slider lies in the same plane as a bore in the slider support plate and thus opens up a duct to the outside directly or by way of above-stated pressure-reducing elements, via which duct the contaminants are passed to the outside.

In this embodiment, it is possible to dispense with further valve units.

The filter plate is then moved in the opposite direction. The slider or the end of the filter plate then reduces the volume of the cleaning chamber and at the same time the surface of the filter plate is cleaned by the blocking wedges or additional scraper profiles, rotating screws, rollers and the like. The contaminants are discharged into the cleaning chamber together with the remainder of the melt.

To simplify discharge over the width, the sliders or cleaning elements are arranged for example obliquely or also in the shape of a V. In the case of the V-shaped arrangement of the cleaning elements, two ducts are provided.

In a further embodiment, two cleaning chambers may be provided.

In this case, the filter is cleaned on one side only to a good half or preferably a good ⅓ of the total length of the filter in the first chamber and at the same time is introduced on the opposite side into the second symmetrically arranged chamber.

As a result of the specific construction, it is also possible to back-flush the filter area with a stream of material from the opposite side when cleaning, i.e. before or during pushing back into the active position.

For this purpose, material is forced actively by an actively driven valve or by corresponding overflow ducts from the clean side towards the now almost pressureless opposite side in the cleaning chamber.

As an alternative, however, a volume of material with filtered material may also be provided on the bottom of the cleaning chamber in such a way as to enable a stream of cleaned material at the bottom during movement of the filter into the cleaning chamber. To this end, overflow ducts are provided which are open in the end position of the support or filter plate. During the cleaning motion, these overflow ducts are closed and the clean material is forced from underneath through the filter support plate and the filter plate.

Since on insertion of the filter plate into the cleaning chamber, melt may also be filtered into the filter chamber and through the filter plate, such backflushing may also take place to a lesser degree without the use of overflow ducts.

Naturally, specific backflow valves may also be inserted in the discharge ducts. It is also possible, after the cleaning process, to modify the properties of the melt, for example, by applying active substances, additives, catalysts etc. via suitable metering valves and apparatuses or via the scraper elements, past which the filter plate moves in the opposite direction in order to bring it back into the filtration position.

According to a further embodiment, two filter chambers are each connected to a common melt duct by means of a switchable valve, in such a way that, when the valve is in the one state, the melt runs through the first filter chamber and, when the switchable valve is in the other state, the melt runs through the second filter chamber.

The valve is configured such that parallel operation is possible. Three or more filter chambers may also be connected in parallel by way of such valves, such that at least one of the filters always ensures melt flow.

In a further embodiment, two or more filter chambers may be arranged one above the other or next to one another in series, such that the outflow of the preceding one is connected to the inflow of the subsequent one and the melt passes successively through the two or more belt filters.

Discharge of the contaminants in the form of the filter cake may proceed sideways in the direction of the sieve motion or at 90° thereto or upwards. What is important here is that in the process the contaminants undergo a pressure reduction to atmospheric pressure.

In the simplest case, this is achieved by a helix or conveying screw. To be able actively to convey the contaminants outwards downstream of the chamber valve, a dedicated helix or conveying screw may convey the material outwards on each side or, if the discharge ducts converge, this may proceed with a common helix or conveying screw. No further excessive degradation of the melt must take place in the process, so as not to generate deposits in the discharge region.

In a further embodiment, the material may however be actively cooled during discharge, such that only high-viscosity or even solidified contaminants arrive outside. To this end, a cold duct decoupled thermally from the heated system is provided in the filter.

BRIEF DESCRIPTION OF THE DRAWINGS

FIGS. 1 to 9 show embodiments according to the invention. In particular:

FIG. 4 shows an embodiment of the filter;

FIG. 5 shows an embodiment of the filter in which only the filter plate is oscillated;

FIG. 6 shows an embodiment for conveying away the filter cake;

FIG. 7 shows an embodiment in which the filter cake is conveyed away in a controlled manner by a conveying screw;

FIG. 8 shows cooling ducts in the cleaning chamber for conveying away the filter cake; and FIG. 9 shows an embodiment according to FIG. 7, in which the pressure is reduced by active cooling by cooling ducts.

DETAILED DESCRIPTION OF THE INVENTION

Figure 1A:
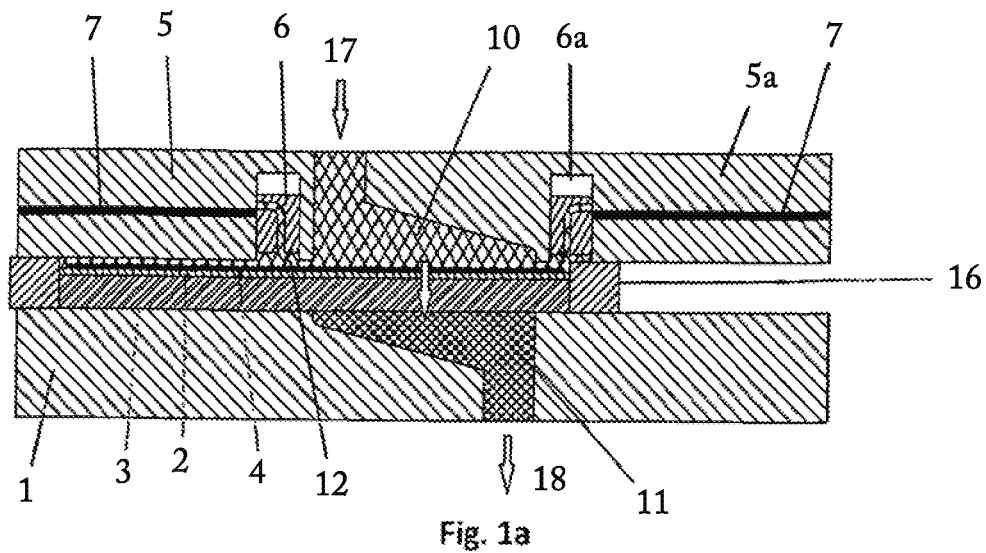
FIGS. 1*a*-1*c* show a method for cleaning the filter.

In the description below, the following reference numbers are used:
1 the filter chamber
2 the filter plate 3 the filter support plate
4 the contaminants (filter cake)
5, 5a a cleaning chamber
6, 6a a blocking slider with integral valve
7 the discharge duct in the cleaning chamber
8 plain bearings
9 a conveying screw for conveying away the filter cake
10 the viscous or highly viscous liquid to be filtered, for example the plastics melt to be filtered
11 the filtrate of the viscous or highly viscous liquid
12 a blocking element
13 an insulating layer
14 heating or cooling ducts
15 the melt chamber for back-flushing
15a the back-flushed melt
16 the slider for moving the filter or the filter support plate
17 the melt inlet
18 the melt outlet
19 a shut-off element for forced back-flushing
20 solidified contaminant material
21 the cleaning zone
22 the filter zone.

Figure 1B:
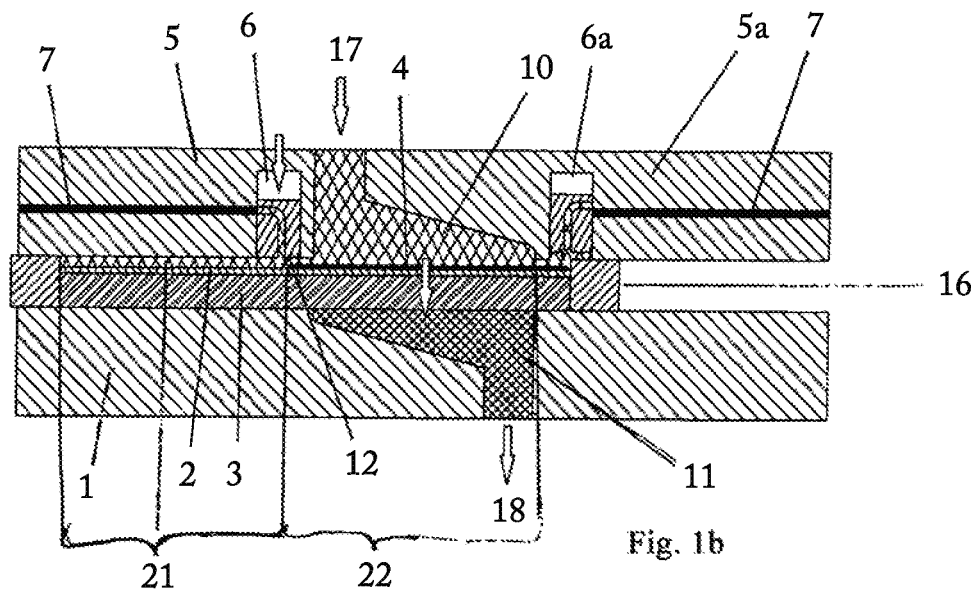
Figure 1C:
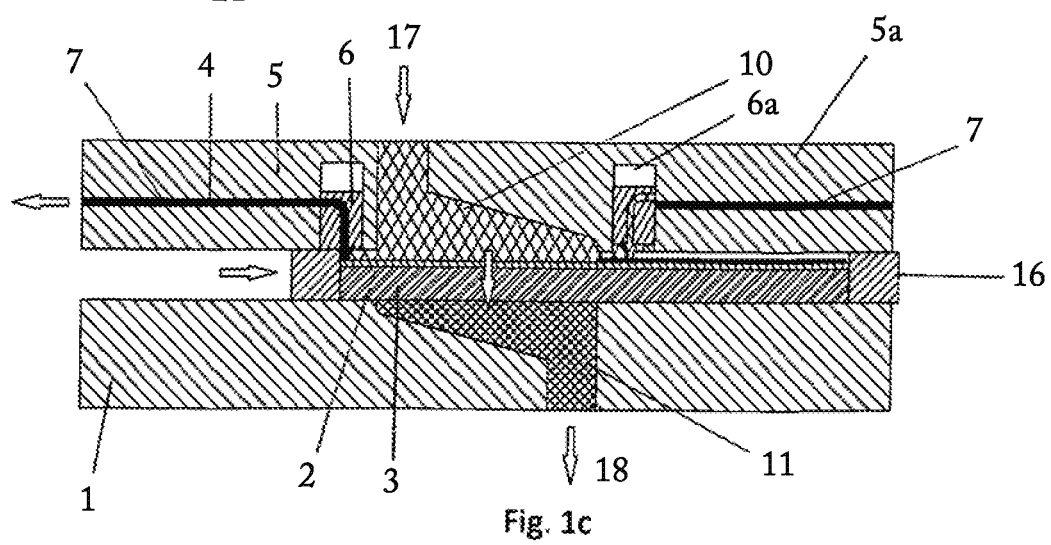

FIGS. 1a-1c show a method for cleaning the filter in which the filter is cleaned without back-flushing.

The device consists in this respect of a filter chamber 1 and a filter plate 2, which is supported by a filter support plate 3.

As shown in FIG. 1a, the contaminants settle on the filter plate 2 as filter cake 4 during the course of the process of filtering a viscous or highly viscous liquid 10.

To clean the filter plate 2 of the filter cake 4, the valve 6, which in this case takes the form of a piston, is actuated and the filter cake 4 is passed into the cleaning chamber 5 and removed from the cleaning chamber through the duct 7. Removal of the filter cake 4 proceeds by displacing the filter plate 2 optionally together with the filter support plate 3 in the direction of the arrows, wherein the filter plate 2 is transported to a second cleaning chamber 5a and the process for complete cleaning of the filter plate is carried out.

Figure 2A:
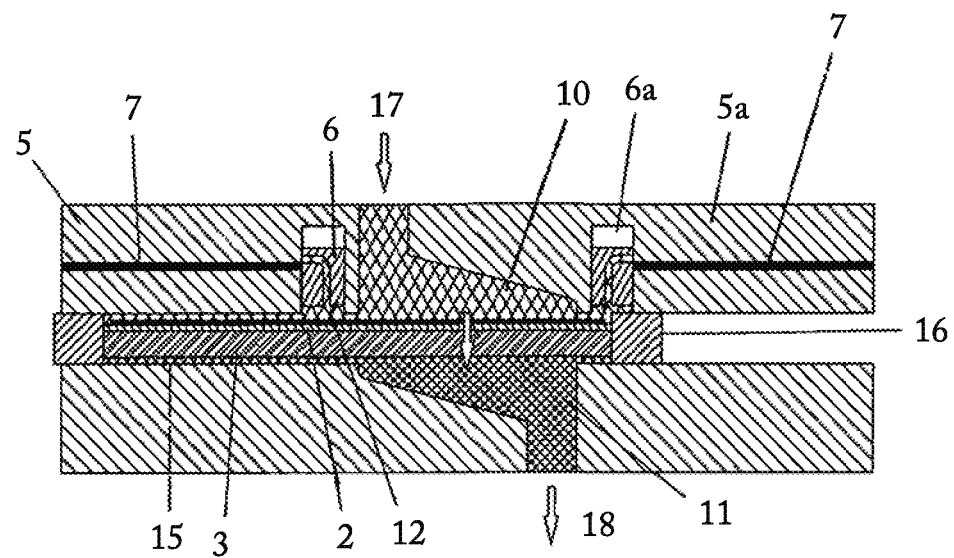
FIGS. 2*a*-2*c* show a method for cleaning the filter with free back-flushing.
Figure 2B:
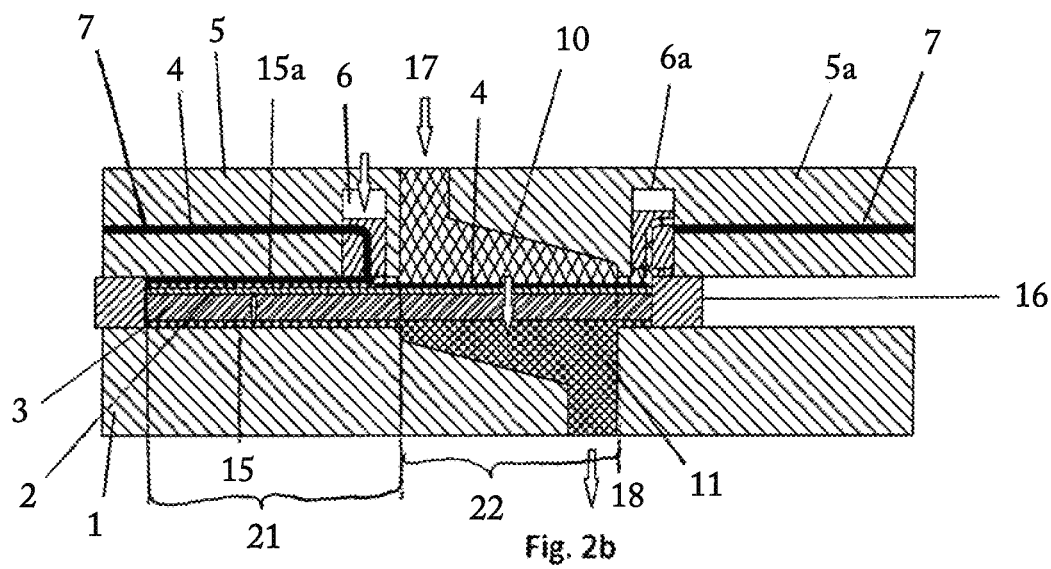
Figure 2C:
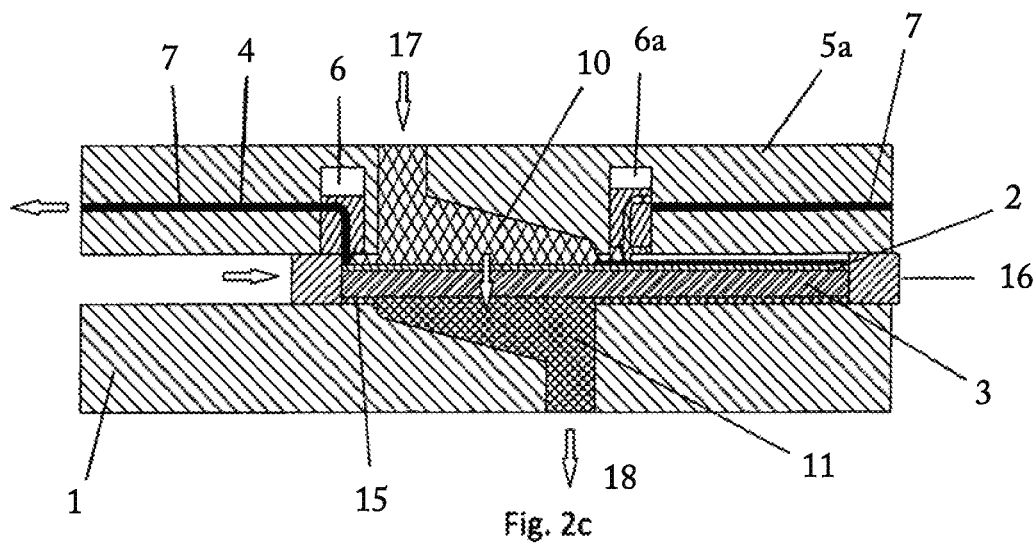

FIGS. 2a-2c show a method for cleaning the filter with free back-flushing.

Here, the pressure difference up- and downstream of the filter plate 2 which arises during cleaning of the filter ensures that some of the filtrate 11 from the melt chamber is forced back for back-flushing 15 through the filter support plate 3 and the filter plate 2 in the back-flushing zone 21 below the filter cake 4 (FIG. 2b). The filter cake 4 is lifted up by the back-flushed melt 15a and in this way forced more readily into the duct 7 of the cleaning chamber 5.

Removal of the filter cake 4 proceeds by displacing the filter plate 2 optionally together with the filter support plate 3 in the direction of the arrows, wherein the filter plate 2 is transported to a second cleaning chamber 5a and the process for further cleaning of the filter plate is carried out.

Figure 3A:
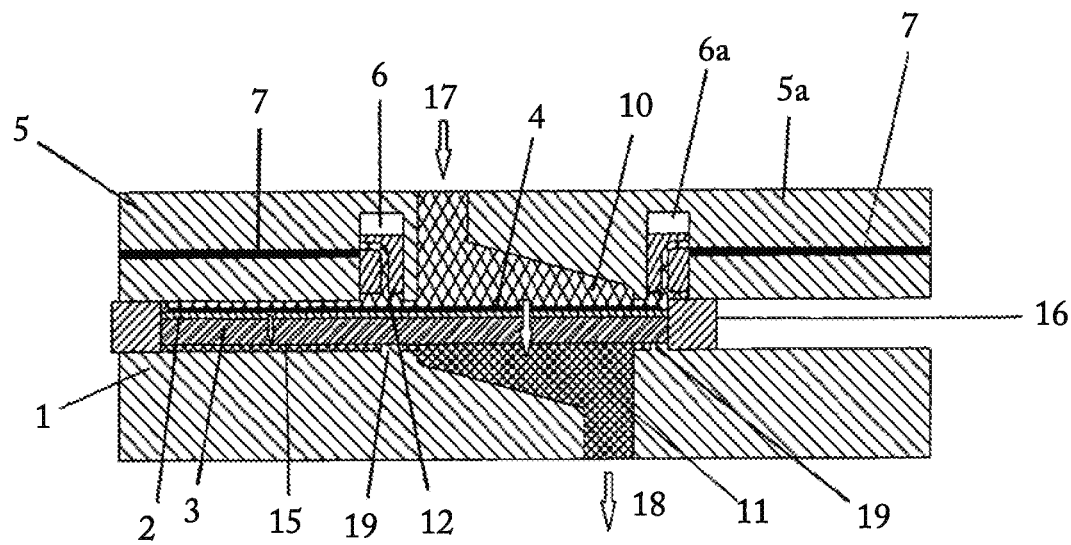
FIGS. 3*a*-3*c* show a filtration method with forced back-flushing.
Figure 3B:
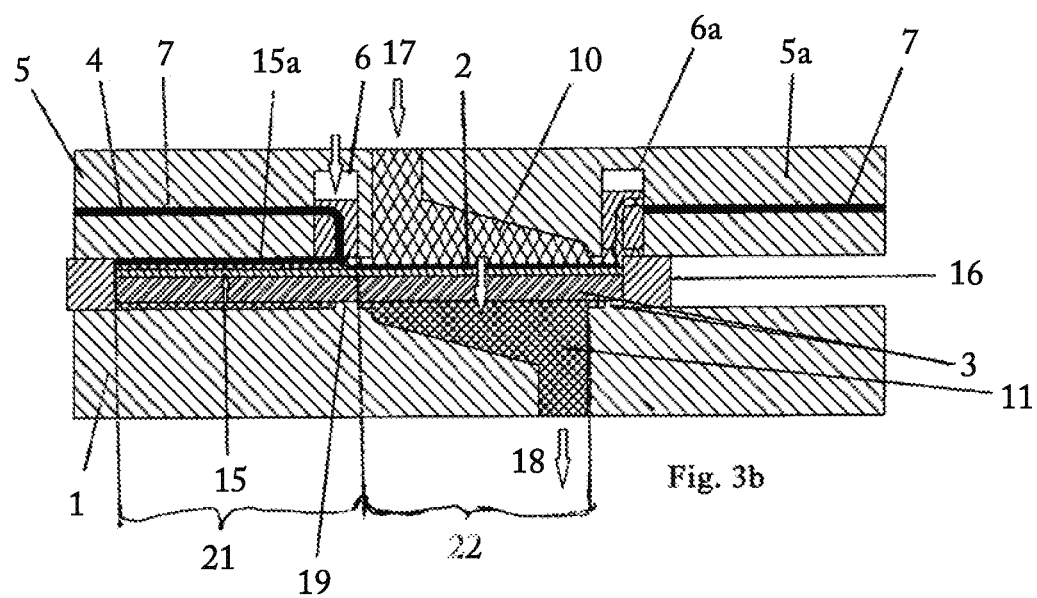
Figure 3C:
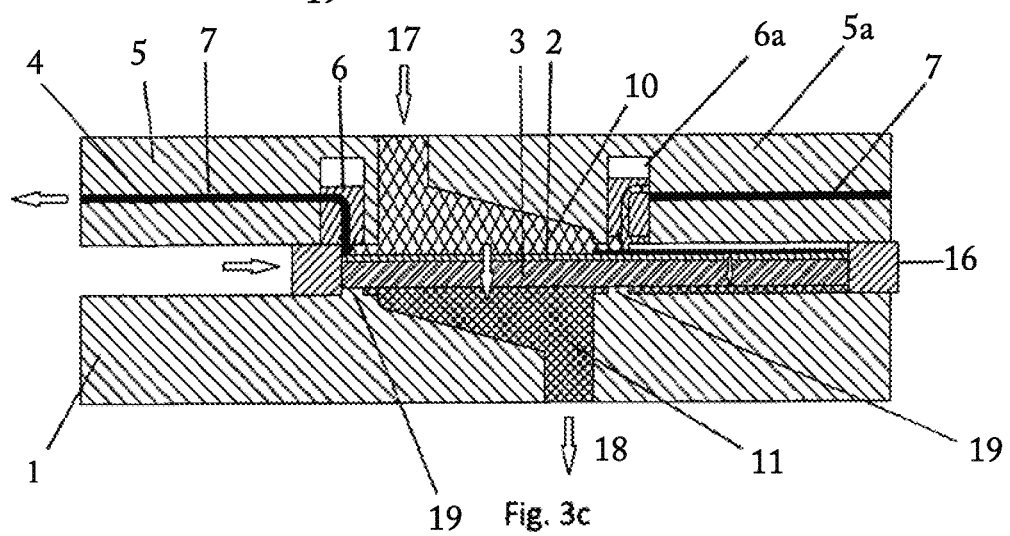

FIGS. 3a-3c show a filtration method with forced back-flushing. Here the back-flushing process is initiated by sealing the back-flushing zone 15 by the slider motion. The filter system here comprises an additional shut-off element 19. The material is forced through the filter from below with elevated pressure and the filter plate cleaning process is carried out as in the procedure shown in FIG. 2.

Figure 4:
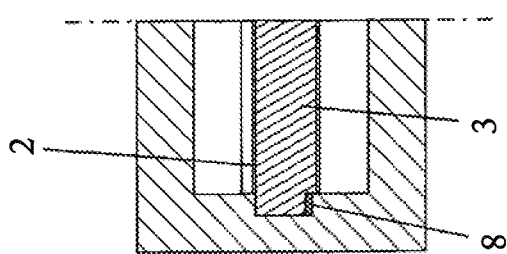
Figure 4:
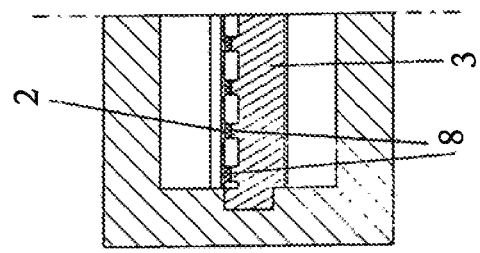
Figure 4:
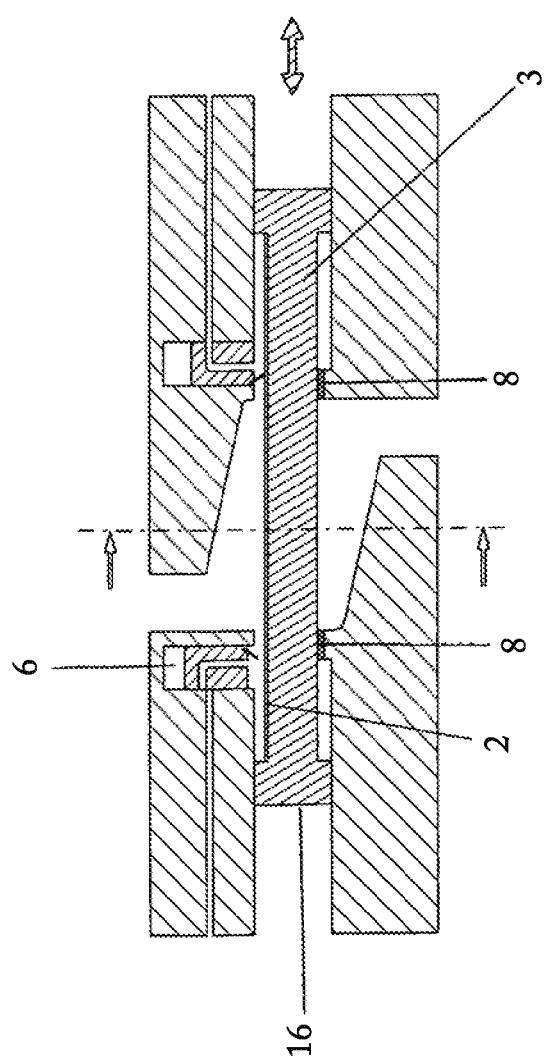

FIG. 4 shows an embodiment of the filter, in which filter plate 2 and filter support plate 3 oscillate together, i.e. are pushed to and fro. The filter support plate 3 is here mounted in the filter chamber 1 on plain bearings 8.

Figure 5:
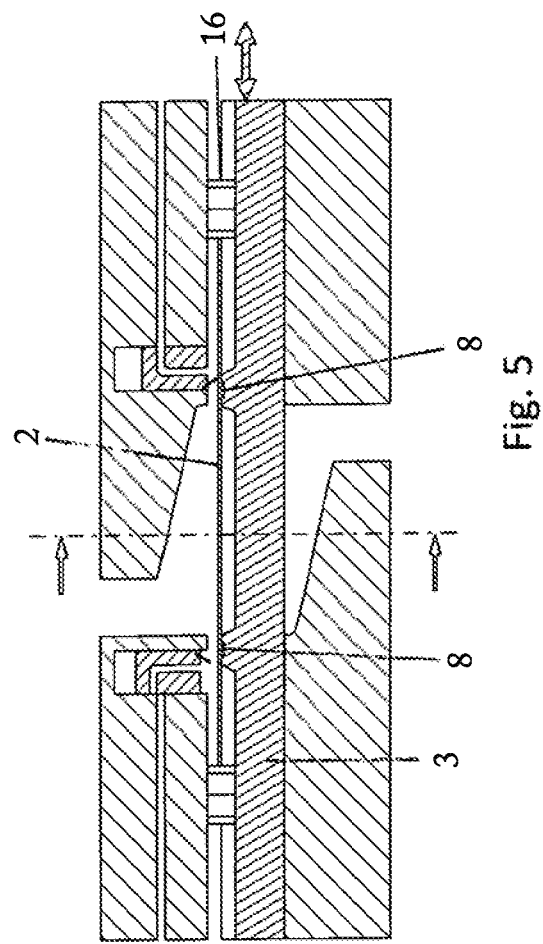

FIG. 5 shows an embodiment of the filter in which only the filter plate 2 is oscillated. In this case, the filter plate 2 is mounted on plain bearings 8 which are situated on the filter support plate 3.

FIG. 6 shows an embodiment for conveying away the filter cake 4 out of the cleaning chamber. In this case, in duct 7 modification of the cross-section reduces the pressure from a pressure level P1 to a pressure level P0, the filter cake 4 thereby being conveyed out of the duct In FIG. 7, filter cake 4 is conveyed away in a controlled manner by means of a conveying screw 9.

In FIG. 8, cooling ducts 14 are provided in the cleaning chamber for conveying away the filter cake 4, such that the pressure in the cleaning chamber is reduced by cooling. The insulating layer 13 serves to decouple the temperature of the discharge duct 7, and thus the temperature of the material to be discharged may be reduced and the viscosity increased by a lower temperature than in the filter.

FIG. 9 shows an embodiment according to FIG. 7, in which the pressure is however reduced by active cooling by cooling ducts 14. Solidified material thereby exits from the end of the discharge duct 2.

The invention claimed is:

1. A filtration system for the continuous filtration of viscous liquids comprising:
    a filter chamber defining an active filter area in a filter zone;
    a groove between an unfiltered chamber and a filtered chamber;
    a filter sieve at least twice as wide as the active filter area;
    a filter sieve support plate, said filter sieve being supported by said support plate and both being slidably disposed in said groove;
    a cleaning chamber arranged on each side of the filter zone;
    a blocking slider on each side of the filter zone; and
    a slider element situated on each side of the filter sieve support plate for reciprocatingly moving said filter sieve and said support plate back and forth so that one portion of the filter sieve can be filtering by flowing unfiltered liquid from said unfiltered chamber through said active filter area to said filtered chamber, while the other portion is being back-flushed by passing a portion of filtered liquid back through said filter sieve in a cleaning area.

2. The filtration system of claim 1, wherein the filter sieve is selected from the group consisting of a belt, a sheet, a plate or a mat.

3. The filtration system of claim 1, wherein the blocking sliders include an integral valve.

4. The filtration system of claim 3, wherein the blocking sliders define a fluid passage capable of permitting any back-flushed liquid to flow to a discharge duct in said cleaning chamber.

* * * * *